UNITED STATES PATENT OFFICE.

JAMES H. STEBBINS, JR., OF NEW YORK, N. Y.

MANUFACTURE OF BLUE COLORING-MATTER.

SPECIFICATION forming part of Letters Patent No. 252,274, dated January 10, 1882.

Application filed November 23, 1881. (Specimens.)

*To all whom it may concern:*

Be it known that I, JAMES H. STEBBINS, Jr., a citizen of the United States, residing at New York, in the county and State of New York, have invented new and useful Improvements in the Manufacture of Blue Coloring-Matter, of which the following is a specification.

This invention relates to a blue dye-stuff or coloring-matter, which is produced by the action of a para-amido dimethylaniline hydrochlorate upon an alkaline solution of the soda salt of alphanaphthol sulpho-acid.

In carrying out my invention I take ten pounds of nitroso-dimethylaniline hydrochlorate and dissolve it in one thousand pounds of water at a temperature of 50° centigrade. To this solution I add ten pounds of zinc-dust and maintain the temperature at 50° centigrade till the solution is entirely decolorized, which is a sign that the para-amido dimethylaniline hydrochlorate is completely formed. I then filter to separate from it the zinc-dust and allow it to cool. When cold I add thereto, under constant stirring, a solution composed of fifteen pounds of the soda salt of alpha-naphtholsulpho-acid, ten pounds of caustic soda, ten pounds of bichromate of potash, and two hundred pounds of water. As soon as the solutions are thoroughly mixed I add thereto sufficient common acetic acid to render the mixture slightly acid. The blue coloring-matter is thus immediately formed, which, after standing a short time, separates out as a blue precipitate, which may be collected on a filter.

My dye-stuff, when dry, appears as a dark blue mass of a metallic luster and it bears a resemblance to Prussian blue. It is soluble in water with a fine blue color. Oxalic acid added to the aqueous solution changes the color to a dirty brown and produces a brown precipitate. An aqueous alkaline solution turns into an amber yellow when treated with grape-sugar when heated at about 80° centigrade, which, when treated with ammoniacal sulphate of copper, turns blue. When an aqueous solution is treated with zinc-dust at a temperature of about 80° centegrade to 100° centigrade it is decolorized into a pale yellow, which assumes its natural blue color when separated from the zinc-dust and exposed to the action of air. It dyes wool, when mordanted with a chrom-mordant, with a fine indigo color. With an alum-mordant and tannin added to the dye-bath it dyes wool with a dark blue-green color.

I am aware that compounds to be used in coloring-matters have been produced by the action of an alkaline solution of alpha-naphthol on para-amido dimethylaniline.

What I claim as new, and desire to secure by Letters Patent, is—

A coloring-matter or dye-stuff produced by the action of the soda salt of monosulpho-acid of alpha-naphthol on para-amido dimethylaniline hydrochlorate, substantially as set forth.

In testimony whereof I have hereunto set my hand and seal in the presence of two subscribing witnesses.

JAMES H. STEBBINS, JR. [L. S.]

Witnesses:
W. HAUFF,
E. F. KASTENHUBER.